(12) United States Patent
Hsiao et al.

(10) Patent No.: US 12,483,132 B2
(45) Date of Patent: Nov. 25, 2025

(54) POWER SUPPLY SYSTEM

(71) Applicants: Inventec Appliances (Pudong) Corporation, Shanghai (CN); Inventec Appliances Corporation, New Taipei (TW); Inventec Appliances (Shanghai) Co. Ltd., Shanghai (CN)

(72) Inventors: Cheng-Hsien Hsiao, New Taipei (TW); Ming-Tsan Lin, New Taipei (TW)

(73) Assignees: Inventec Appliances (Pudong) Corporation, Shanghai (CN); Inventec Appliances Corporation, New Taipei (TW); Inventec Appliances (Shanghai) Co. Ltd., Shanghai (CN)

( * ) Notice: Subject to any disclaimer, the term of this patent is extended or adjusted under 35 U.S.C. 154(b) by 339 days.

(21) Appl. No.: 17/940,866

(22) Filed: Sep. 8, 2022

(65) Prior Publication Data

US 2023/0283183 A1  Sep. 7, 2023

(30) Foreign Application Priority Data

Mar. 1, 2022  (CN) .......................... 202210199494.5

(51) Int. Cl.
  *H02M 3/158* (2006.01)
  *B60L 53/20* (2019.01)
  *H02M 1/00* (2006.01)

(52) U.S. Cl.
  CPC ............. *H02M 3/158* (2013.01); *B60L 53/20* (2019.02); *H02M 1/0009* (2021.05); *H02M 1/007* (2021.05); *B60L 2210/12* (2013.01)

(58) Field of Classification Search
  CPC .. H02M 1/007; H02M 1/0067; H02M 1/0074; H02M 1/0077; H02M 1/008;
  (Continued)

(56) References Cited

U.S. PATENT DOCUMENTS 6,670,794 B1 * 12/2003 Wang .................. H02M 3/1584
                                                      323/213
12,267,014 B2 * 4/2025 Muhammad ........ H02M 3/1582
(Continued)

FOREIGN PATENT DOCUMENTS

CN        108365742 A     8/2018
TW        200643677 A    12/2006
(Continued)

*Primary Examiner* — Jeffrey A Gblende

(57) ABSTRACT

A power supply system for outputting current to a load comprises a first power supply, a plurality of DC/DC converters connected to the first power supply in parallel, a second power source connected in parallel with the DC/DC converters and coupled to the load and a current sensor. The current sensor is configured between the first power supply and a low potential side of input terminals of the plurality of DC/DC converters, and the current sensor is configured for sensing a current information of the power supply system. When the power supply system outputs current to the load or the load can be charged back to the power supply system, the current sensor can measure the current information of each DC/DC converter through the current change of the switching states of the power switches inside the DC/DC converters, and has a simple circuit structure.

8 Claims, 6 Drawing Sheets

(58) Field of Classification Search
CPC ............. H02M 1/0083; H02M 1/0088; H02M 1/0009; H02M 3/158; H02M 3/1584; H02M 3/156; H02M 3/142; H02M 3/1582; H02M 3/157; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/0095; H02M 1/08; H02M 1/088; H02M 3/1588; H02M 7/5395; H02M 1/14; H02M 1/0043; H02J 3/46; H02J 3/38; B60L 53/20; B60L 2210/12; B60L 2210/10; B60L 2210/00; B60L 2210/14

See application file for complete search history.

(56) References Cited

U.S. PATENT DOCUMENTS

| | | | |
|---|---|---|---|
| 2005/0140347 A1* | 6/2005 | Chen | H02M 3/1584 323/282 |
| 2009/0102288 A1 | 4/2009 | Blackmond | |
| 2011/0187189 A1* | 8/2011 | Moussaoui | H02M 3/158 307/31 |
| 2014/0268891 A1* | 9/2014 | Sigamani | H02M 1/14 363/17 |
| 2020/0076304 A1* | 3/2020 | Oyama | H02M 3/1582 |

FOREIGN PATENT DOCUMENTS

| | | |
|---|---|---|
| TW | 200740093 A | 10/2007 |
| TW | 201324108 A | 6/2013 |

\* cited by examiner

POWER SUPPLY SYSTEM

The present application is based on, and claims priority from China application number 202210199494.5, filed on 2022 Mar. 1, the disclosure of which is hereby incorporated by reference herein in its entirety.

BACKGROUND OF THE INVENTION

Field of the Invention

The present invention relates to a power supply system for outputting power to a load, and in particular, a power supply system using a plurality of DC/DC converters and capable of detecting current information of each DC/DC converter.

Description of the Prior Art

Nowadays, due to the limitation of global oil reserves and the rising awareness of environmental protection, electric vehicles have been emerging and gradually becoming a new trend of land transportation. Even in some countries, policies such as banning the sale of fuel vehicles will be promoted in the next few years to reduce greenhouse gases and suspended particulates emitted by vehicles, which makes electric vehicles become a new industry that will attract attention in the future. Compared with fuel vehicles, electric vehicles use battery energy storage as a power supply. Therefore, the design of battery packs is a key research and development direction for electric vehicles.

Whether it is a pure electric vehicle or a hybrid electric vehicle, the battery that supplies its energy is a rechargeable battery. Compared with ordinary vehicles that only use electricity as a function of starting, lighting or ignition, the battery of the electric vehicle needs to have continuous power output for a long time. Therefore, a battery pack is usually composed of a plurality of batteries to provide sufficient power. In the prior art, a battery pack of the electric vehicle may be composed of two or more batteries connected in parallel by a DC/DC converter, or the battery may be outputted by the DC/DC converter and connected in parallel with another battery. Due to the high-power requirements of electric vehicles, several DC/DC converters can be used in parallel at the same time. In addition, the battery pack can also be adjusted to an output or charging mode when the electric vehicle is in different driving states. For example, when an electric vehicle starts work or climbs a hill, a large current is required to increase the torque. Because the battery power is not the same, under high current output, the battery voltage is different. Therefore, the DC/DC converter of the battery pack is in a forward step-down output and controls the output voltage to be the same to provide dual or multi-channel parallel connection, so that both cells can supply current. In addition, when the electric vehicle brakes, coasts or goes downhill, it will regenerate electricity. Therefore, the DC/DC converter of the battery pack is in the reverse step-up conversion mode to provide a parallel dual or multi-channel, so that the regenerative energy can be recharged to the two batteries.

When the battery pack is working, a current sensing resistor is usually installed to obtain the current information of the DC/DC converter in the battery pack, so as to monitor the working conditions of the battery pack and the DC/DC converter. In the prior art, the current sensing resistor is generally disposed between the low potential output side of the DC/DC converter and the second battery. However, as mentioned earlier, battery packs are usually designed with multiple DC/DC converters for high power output. When the converters work in parallel, the design of the current sensing resistor will cause the current on the current sensing resistor not to correspond to the actual output current of each converter due to the different ground impedances of the converters, and then it is impossible to individually control the output current of either converter. Therefore, this design cannot monitor a single DC/DC converter.

On the other hand, in the prior art, there is another design of a current sensing resistor disposed on the high-potential output side of the DC/DC converter, which can monitor a single DC/DC converter. However, this design requires the addition of a precise differential amplifier circuit and a potential conversion circuit to operate. In addition to increasing circuit complexity and manufacturing cost, the sensing accuracy will also be affected after potential conversion.

Therefore, how to design a current sensor capable of detecting the current information of a single DC/DC converter and having a simple circuit structure in the above-mentioned battery pack is a technical problem to be solved by those skilled in the art.

SUMMARY OF THE INVENTION

In order to overcome the above-mentioned defects in the prior art, one category of the present invention is to provide a power supply system having a current sensor which has a simple circuit structure and can detect the current information of a single converter in a parallel structure of multiple DC/DC converters. According to an embodiment of the present invention, the power supply system comprises a first power supply, a plurality of DC/DC converters, a second power supply and a current sensor. The DC/DC converters are respectively connected in parallel with the first power supply, and the second power supply and the DC/DC converters are connected in parallel with each other and configured to connect the load. The current sensor is disposed between the first power supply and a low potential side of the DC/DC converters, and is configured for sensing the current information of the power supply system.

Wherein, the DC/DC converters are buck converters, which are half-bridge structures and respectively comprise a first transistor connected to a high potential output terminal of the first power supply and a second transistor connected to a ground terminal of the first power supply.

Wherein, the power supply system further comprises a controller coupled to the first transistors and the second transistors of the plurality of DC/DC converters to respectively control the conducting states of the first transistors and the second transistors.

Wherein, the controller is a pulse-width modulation controller (PWM controller) and is configured for outputting pulse signals to the first transistors and the second transistors respectively to respectively control the conducting states of the first transistors and the second transistors.

Wherein, the number of the DC/DC converters is 2, and the current sensor is a current sensing resistor; the current sensing resistor is disposed between the ground terminal of the first power supply and the low potential side of the input terminals of the DC/DC converters.

Wherein, the DC/DC converters are controlled by the controller to be turned on and off respectively, and the current sensor senses the current information of the DC/DC converters respectively.

Wherein, the number of the DC/DC converters is 3 or more than 3, and the current sensor further comprises a plurality of current sensing resistors. The number of the current sensing resistors is equal to the number of the DC/DC converters, and the current sensing resistors are respectively connected to the low potential sides of the input terminals of the DC/DC converters to sense the individual current information of the DC/DC converters respectively.

Wherein, the load is an electric vehicle system, and the power supply system switches between a forward step-down mode and a reverse step-up mode according to traveling conditions of the electric vehicle system.

Wherein, when the power supply system is in the forward step-down mode, the controller turns on at least one of the first transistors of the DC/DC converters to connect the first power supply and the second power supply in parallel to enable the first power supply and the second power supply to output power to the load, and the current sensor receives the current flowing from the low potential side of the input terminals of the DC/DC converters to the ground terminal of the first power supply.

Wherein, when the power supply system is in the reverse step-up mode, the controller turns on at least one of the first transistors of the DC/DC converters to connect the first power supply and the second power supply in parallel to enable the first power supply and the second power supply to be recharged by a regenerative power of the load, and the current sensor receives the current flowing from the ground terminal of the first power supply to the low potential side of the DC/DC converters.

Compared with the prior art, the current sensor of the power supply system of the present invention is disposed between the first power supply and the low potential side of the input end of the DC/DC converter. The power supply system of the present invention can make a single DC/DC converter flow current by controlling the conducting state of the transistor in the DC/DC converter. Therefore, the current sensor can sense and monitor the individual current information of a single DC/DC converter in multiple parallel DC/DC converters. In addition, the current sensor of the power supply system of the present invention can directly use a current sensing resistor without additionally disposing a differential amplifier circuit and a potential conversion circuit, so that the circuit structure is simpler and the manufacturing cost can be reduced.

BRIEF DESCRIPTION OF THE APPENDED DRAWINGS

Some of the embodiments will be described in detail, with reference to the following figures, wherein like designations denote like members, wherein.

Figure 1:
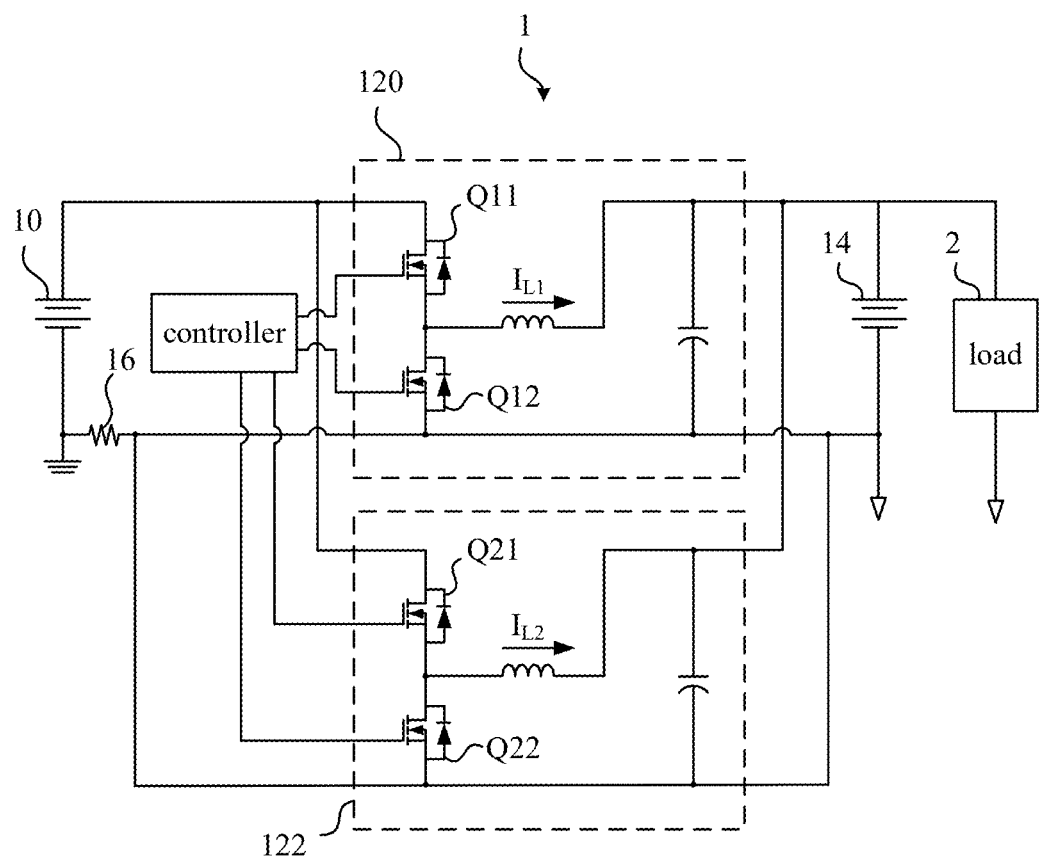
FIG. 1 shows a schematic diagram of a power supply system according to an embodiment of the present invention.

The advantages, spirits, and features of the present invention will be explained and discussed with embodiments and figures as follows.

DETAILED DESCRIPTION OF THE INVENTION

In order to make the advantages, spirit and features of the present invention easier and clearer, it will be detailed and discussed in the following with reference to the embodiments and the accompanying drawings. It is worth noting that the embodiments are merely representatives of the embodiments of the present invention, and the methods, devices, conditions, materials, etc. exemplified therein are not intended to limit the present invention or the corresponding embodiments. Rather, these embodiments are provided so that this disclosure will be thorough and complete and will fully convey the concept of example embodiments to those skilled in the art to which this invention belongs. The described features, structures, or characteristics can be combined in any suitable manner in one or more embodiments. Furthermore, the drawings are merely schematic illustrations of the present disclosure and are not necessarily drawn to scale. The same drawing numerals in the drawings denote the same or similar parts, and thus their repeated descriptions will be omitted.

Please refer to FIG. 1. FIG. 1 shows a schematic diagram of a power supply system 1 according to an embodiment of the present invention. As shown in FIG. 1, the power supply system 1 comprises a first power supply 10, a first DC/DC converter 120, a second DC/DC converter 122 and a second power supply 14. The first DC/DC converter 120 and the second DC/DC converter 122 are both connected in parallel with the first power supply 10 and the second power supply 14. The second power supply 14 can be coupled to a load 2, so that the power supply system 1 can provide power to the load 2, or recharge the regenerative power of the load 2 to the first power supply 10 and the second power supply 14.

In this embodiment, the load 2 can be an electric vehicle system, and the first power supply 10 and the second power supply 14 can be batteries suitable for the electric vehicle system, such as lithium-ion batteries, lithium-ion battery polymer batteries, lead/acid batteries, nickel-cadmium batteries, and nickel-hydrogen batteries. The first DC/DC converter 120 and the second DC/DC converter 122 may be buck converters. However, in practice, the above-mentioned first power supply, second power supply, first DC/DC converter and second DC/DC converter can be different types of batteries and different types of converters, depending on the requirements of the load.

In this embodiment, the power supply system 1 further comprises a current sensor 16, which is a current sensing resistor disposed between the ground terminal of the first power supply 10 and the low potential side of the input terminals of the first DC/DC converter 120 and the second DC/DC converter 122. Specifically, the low potential side of the input terminal of the first DC/DC converter 120 and the low potential side of the input terminal of the second DC/DC converter 122 are connected to each other, and they are connected in series with the current sensor 16 and the ground terminal of the first power supply 10.

As mentioned above, the power supply system 1 of this embodiment can be configured for the load 2 of the electric vehicle system. Therefore, the power supply system 1 can have two modes of forward step-down mode and reverse step-up mode corresponding to starting, uphill, braking, coasting or downhill of the electric vehicle. The forward step-down mode is configured to provide current to the load 2 during starting, uphill and normal driving. The reverse step-up mode is configured to recharge the regenerative energy of the load 2 to the first power supply 10 and the second power supply 14 when braking, coasting or descending a slope. In this mode, the high potential output terminal of the first power supply 10 outputs voltage and current. After being stepped down by either the first DC/DC converter 120 or the second DC/DC converter 122, the output current is output to the load 2 together with the current of the second power supply 14.

In the forward step-down mode, the first DC/DC converter 120 and the second DC/DC converter 122 can be controlled by a controller to make one of them work to generate a channel between the first power supply 10 and the second power supply 14. Further, the first power supply 10 and the second power supply 14 are connected in parallel to supply power to the load 2. The function of the first DC/DC converter 120 or the second DC/DC converter 122 is to reduce the voltage of the first power supply 10 to be close to the voltage of the second power supply 14. This can prevent the two power supplies from heating up due to internal circulating currents and shortening the life of the power supplies. At this time, one of the first DC/DC converter 120 and the second DC/DC converter 122 will generate a current from the low potential side of its input terminal through the current sensor 16 to the ground terminal of the first power supply 10. As described above, since the controller can control one of the first DC/DC converter 120 and the second DC/DC converter 122 to work and make the other inactive. Therefore, the current through the current sensor 16 is the current of the DC/DC converter in operation. By interworking the first DC/DC converter 120 and the second DC/DC converter 122, the current sensor 16 can obtain current information of the first DC/DC converter 120 and the second DC/DC converter 122 respectively.

As shown in FIG. 1, the first DC/DC converter 120 and the second DC/DC converter 122 are both half-bridge structures. The first DC/DC converter 120 comprises a first transistor Q11 and a second transistor Q12. The first transistor Q11 is connected to the high potential output terminal of the first power supply 10, and the second transistor Q12 is connected to the ground terminal of the first power supply 10. In addition, the second DC/DC converter 122 comprises a first transistor Q21 and a second transistor Q22. The first transistor Q21 is connected to the high potential output terminal of the first power supply 10, and the second transistor Q22 is connected to the ground terminal of the first power supply 10. The first transistor Q11, the second transistor Q12, the first transistor Q21 and the second transistor Q22 can be connected to the aforementioned controller, and the controller can be a pulse-width modulation controller (PWM controller) which can output the pulse signals to the first transistor Q11, the second transistor Q12, the first transistor Q21 and the second transistor Q22 respectively to make them conduct. Then, the working states of the first DC/DC converter 120 and the second DC/DC converter 122 are controlled. Specifically, when the first transistor Q11 is conducted and the second transistor Q12 is unconducted, the first DC/DC converter 120 is in the working state. At this time, the channel generated by the first DC/DC converter 120 is connected in parallel between the first power supply 10 and the second power supply 14. The first power supply 10 generates a current to flow through the first transistor Q11 of the first DC/DC converter 120, so that the current $I_{L1}$ flowing through its inductance increases. The current sensor 16 receives the current from the first DC/DC converter 120. Conversely, when the first transistor Q11 is unconducted and the second transistor Q12 is conducted, the first DC/DC converter 120 is in a non-working state. At this time, the first power supply does not have current flowing through the first transistor Q11 of the first DC/DC converter 120, so that the current $I_{L1}$ of the inductance thereof is reduced. The current sensor 16 does not receive the current from the first DC/DC converter 120 because the second transistor Q12 is conducted. The control of the second DC/DC converter 122 is also controlled in the same way as the first DC/DC converter 120, but the time when the two are in the working state is staggered. In addition, the first DC/DC converter 120 and the second DC/DC converter 122 enter the working state periodically, and this period is the working period of both.

In this embodiment, the first transistor Q11, the second transistor Q12, the first transistor Q21 and the second transistor Q22 are all metal oxide semiconductor field effect transistors.

Figure 2:
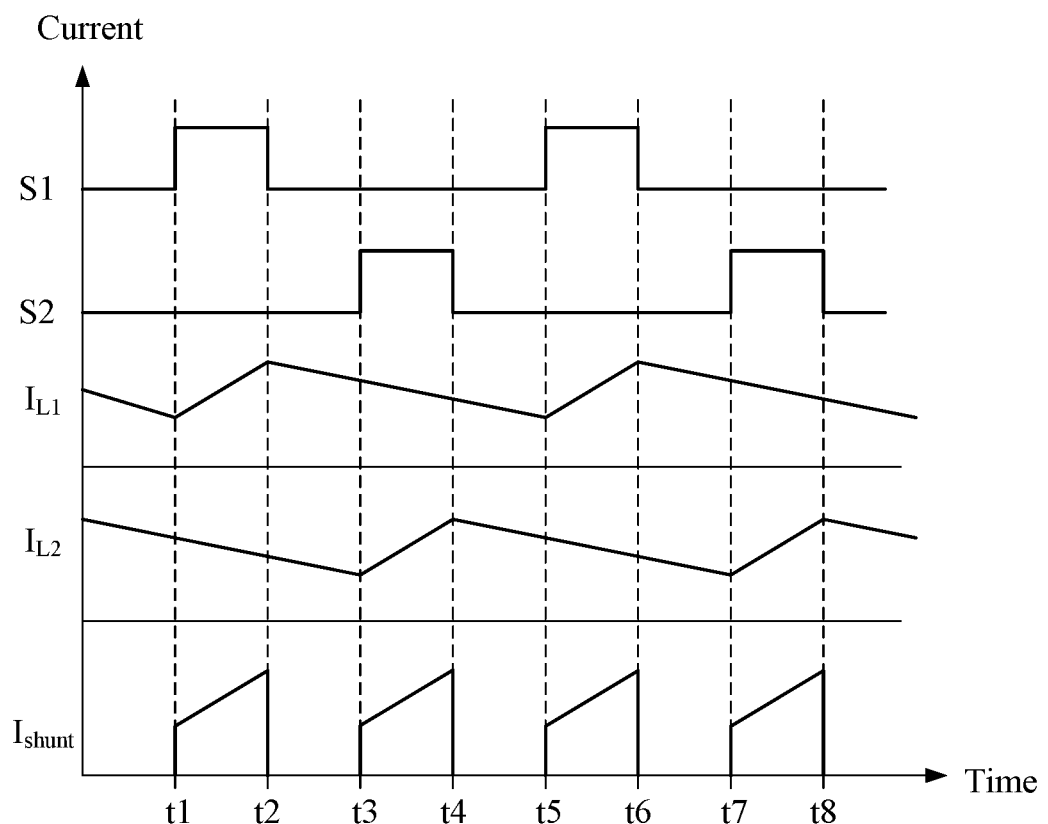
FIG. 2 shows a schematic diagram of current information of a first DC/DC converter and a second DC/DC converter when the power supply system of FIG. 1 is in a forward step-down mode.

Through the control of the first DC/DC converter 120 and the second DC/DC converter 122 by the pulse-width modulation controller, the currents $I_{L1}$ and $I_{L2}$ of the first DC/DC converter 120 and the second DC/DC converter 122 can be respectively increased, and currents respectively flow into the current sensor 16. Further, the current information of the first DC/DC converter 120 and the second DC/DC converter 122 can be obtained independently. Please refer to FIG. 1 and FIG. 2 together. FIG. 2 shows a schematic diagram of current information of a first DC/DC converter and a second DC/DC converter when the power supply system 1 of FIG. 1 is in a forward step-down mode. As shown in FIG. 2, the pulse portion of the control signal S1 represents that the first transistor Q11 is conducted and the second transistor Q12 is unconducted, and the remaining portion represents that the first transistor Q11 is unconducted and the second transistor Q12 is conducted. In other words, the pulse portion of the control signal S1 represents the working state of the first DC/DC converter 120. Likewise, the pulse portion of the control signal S2 represents the working state of the second DC/DC converter 122. As shown in FIG. 2, $I_{L1}$ and $I_{L2}$ are obtained by directly extracting the current from the inductors in the first DC/DC converter 120 and the second DC/DC converter 122, and $I_{shunt}$ is the current information sensed by the current sensor 16.

As shown in FIG. 2, $I_{L1}$ and $I_{L2}$ increase only during the pulse portion of the control signal S1 and the control signal S2 and flow from the first DC/DC converter 120 or the second DC/DC converter 122 through the current sensor 16. Therefore, the current information obtained by the current sensor 16 during the time period of the pulse portion of the control signal S1 and the control signal S2 is the current information of the corresponding first DC/DC converter 120 or the corresponding second DC/DC converter 122. For example, the current information sensed by the current sensor 16 in the time period from t1 to t2 or from t5 to t6 is the current information of the first DC/DC converter 120, and the current information in the time period from t3 to t4 or from t7 to t8 is the current information of the second DC/DC converter 122.

Figure 3:
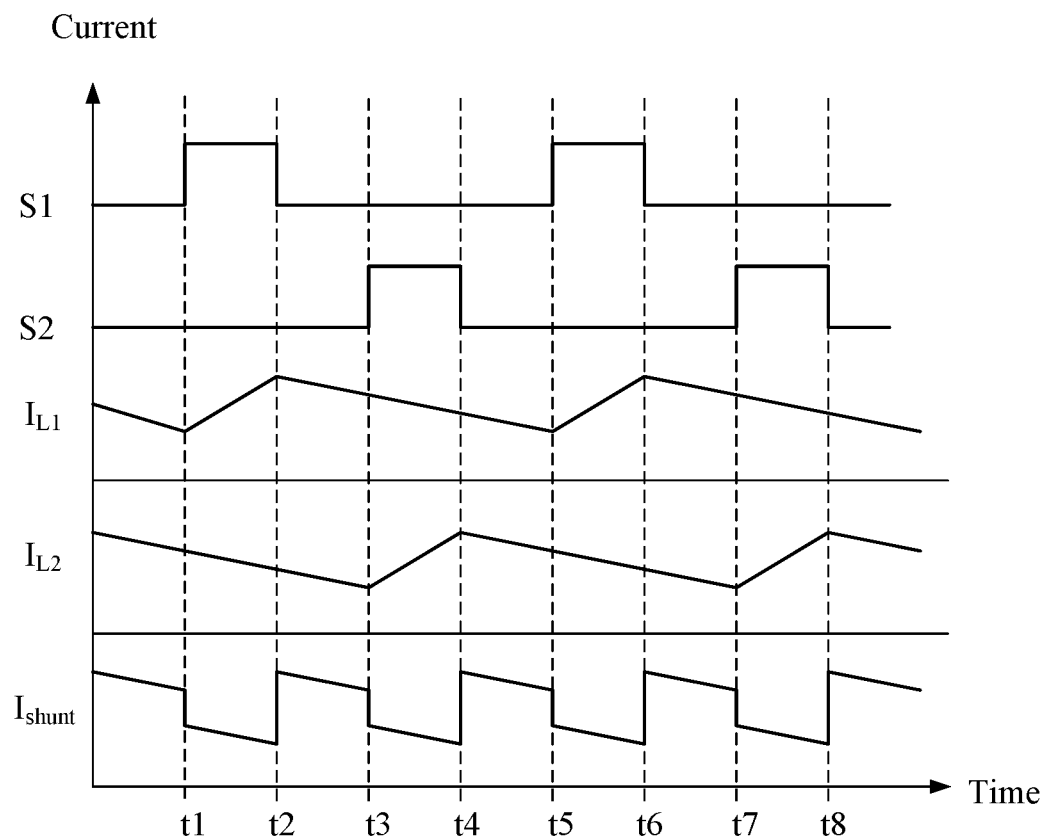
FIG. 3 shows a schematic diagram of current information of a first DC/DC converter and a second DC/DC converter when the power supply system of FIG. 1 is in a reverse step-up mode.

In addition, in the reverse step-up mode, the pulse-width modulation controller can also respectively output pulse signals to the first transistor Q11, the second transistor Q12, the first transistor Q21 and the second transistor Q22 to conduct them, so as to control the working states of the first DC/DC converter 120 and the second DC/DC converter 122. Similarly, when the first transistor Q11 is conducted and the second transistor Q12 is unconducted, the first DC/DC converter 120 is in a working state and the first power supply 10 and the second power supply 14 are connected in parallel through the channel generated by the first DC/DC converter 120. When the first transistor Q21 is conducted and the second transistor Q22 is unconducted, the second DC/DC converter 122 is in a working state and the first power supply 10 and the second power supply 14 are connected in parallel through the channel generated by the second DC/DC converter 122. Please refer to FIG. 1 and FIG. 3 together. FIG. 3 shows a schematic diagram of current information of a first DC/DC converter and a second DC/DC converter when the power supply system of FIG. 1 is in a reverse step-up mode. As shown in FIG. 3, the pulse-width modulation controller controls the duty cycle of the first DC/DC converter 120 and the second DC/DC converter 122 to be substantially the same as in the forward step-down mode. However, the load 2 charges the first power supply 10 and the second power supply 14 during the reverse step-up mode. Therefore, when the first DC/DC converter 120 and the second DC/DC converter 122 are in the working state, the current of the load 2 flows into the high potential output terminals of the first power supply 10 and the second power supply 14, and when the two converters are in a non-working state (the second transistors Q12 and Q22 are conducted), the current sensor 16 flows through the current sensor 16. The $I_{shunt}$ sensed by the current sensor 16 decreases respectively when the first DC/DC converter 120 and the second DC/DC converter 122 are in the working state (e.g. the time period from t1 to t2 and the time period from t3 to t4).

In summary, through the current sensor 16 disposed between the ground terminal of the first power supply 10 and the low potential side of the input terminals of the first DC/DC converter 120 and the second DC/DC converter 122 and duty cycle control for the first DC/DC converter 120 and the second DC/DC converter 122, the individual current information of the first DC/DC converter 120 and the second DC/DC converter 122 can be obtained independently either in the forward step-down mode or the reverse step-up mode. In addition, the current sensor 16 does not need an additional differential amplifier circuit or a potential conversion circuit, which can maintain a simple circuit structure to improve accuracy and reduce manufacturing costs.

Figure 4:
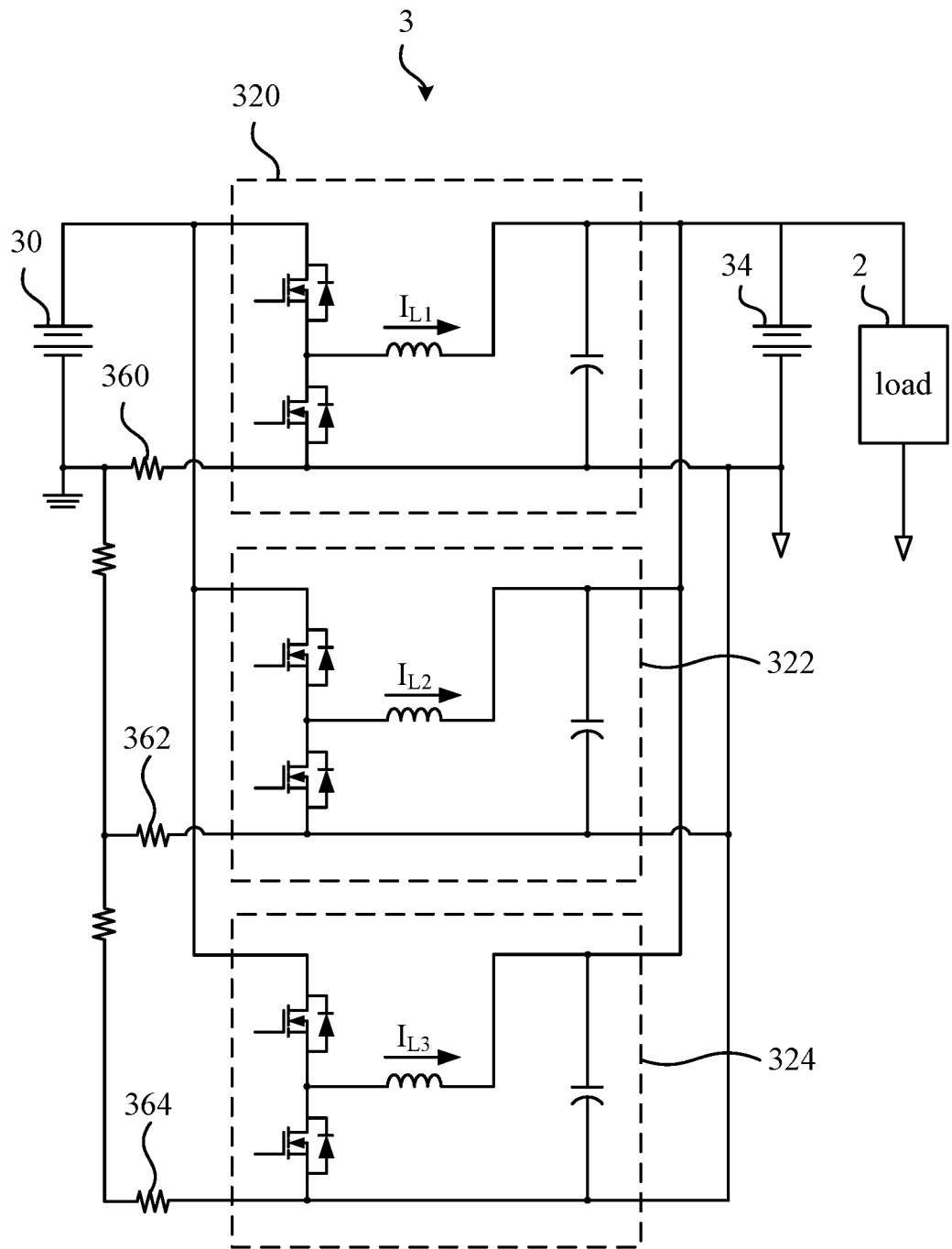
FIG. 4 shows a schematic diagram of a power supply system according to another embodiment of the present invention.

In the aforementioned embodiment, two DC/DC converters are connected in parallel between the first power supply 10 and the second power supply 14. In practice, this architecture can be used in the power system of electric locomotives. However, compared to electric vehicles, electric vehicles have higher power requirements, so more DC/DC converters are connected in parallel between the two power supplies. Please refer to FIG. 4. FIG. 4 shows a schematic diagram of a power supply system 3 according to another embodiment of the present invention. In practice, the power supply system 3 can be configured for electric vehicles. As shown in FIG. 3, the power supply system 3 comprises a first power supply 30, a first DC/DC converter 320, a second DC/DC converter 322, a third DC/DC converter 324 and a second power supply 14. The first DC/DC converter 320 and the second DC/DC converter 322 are connected in parallel with the first power supply 30 and the second power supply 34, respectively. The second power supply 34 can be coupled to the load 2, so that the power supply system 3 can provide power to the load 2, or recharge the regenerative power of the load 2 to the first power supply 30 and the second power supply 34. The first DC/DC converter 320, the second DC/DC converter 322, and the third DC/DC converter 324 in FIG. 4 have the same internal structures as the DC/DC converters in the foregoing embodiments, so the descriptions will not be repeated herein. Please note that although the number of DC/DC converters in this embodiment is three, in practice, there may be more than three, and the number depends on design requirements, which is not limited in the present invention.

In this embodiment, the power supply system 3 further includes current sensing resistors 360, 362, and 364, which are respectively disposed on the low potential sides of the input terminals of the first DC/DC converter 320, the second DC/DC converter 322, and the third DC/DC converter 324. The difference between this embodiment and the previous embodiment is that the low potential sides of the input terminals of the three DC/DC converters in this embodiment are first connected to the current sensing resistors respectively, and then connected to the ground terminal of the first power supply together. However, the low potential sides of the input terminals of the DC/DC converter in the previous embodiment are first connected to each other and then connected to the current sensing resistor and the ground terminal of the first power supply. Both architectures can obtain individual current information of the DC/DC converter independently.

Figure 5:
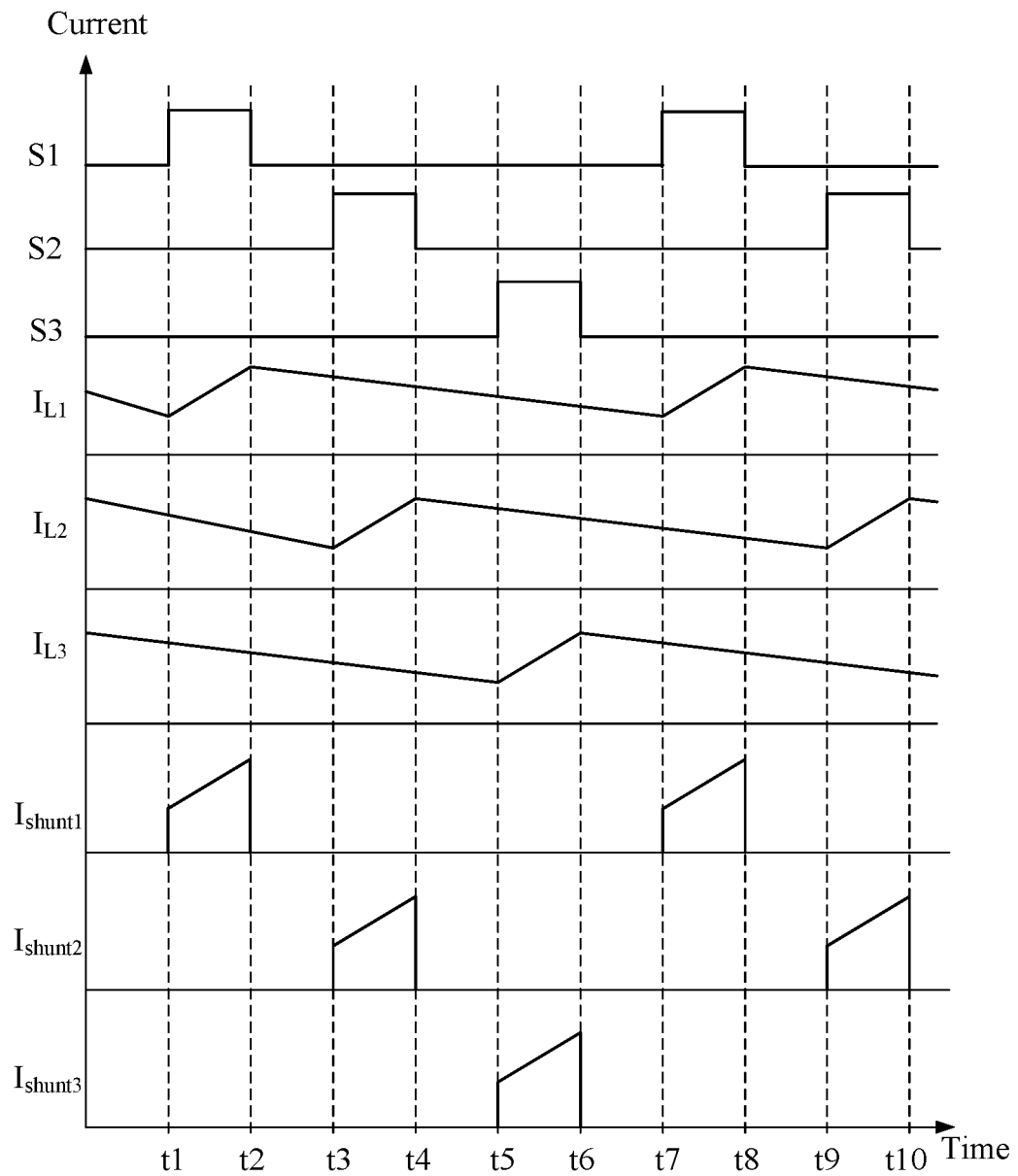
FIG. 5 shows a schematic diagram of current information of a first DC/DC converter, a second DC/DC converter and a third DC/DC converter when the power supply system of FIG. 4 is in a forward step-down mode.

Please refer to FIG. 4 and FIG. 5 together. FIG. 5 shows a schematic diagram of current information of a first DC/DC converter 320, a second DC/DC converter 322 and a third DC/DC converter 324 when the power supply system 3 of FIG. 4 is in a forward step-down mode. As shown in FIG. 5, when the first DC/DC converter 320, the second DC/DC converter 322 and the third DC/DC converter 324 are respectively controlled by the pulse-width modulation controller to have alternate duty cycles, the channels generated by the first DC/DC converter 320, the second DC/DC converter 322 or the third DC/DC converter 324 are connected in parallel between the first power supply 30 and the second power supply 34 respectively to output current to the load 2. The current sensing resistors 360, 362 and 364 can sense the current information $I_{shunt1}$, $I_{shunt2}$ and $I_{shunt3}$ of the first DC/DC converter 320, the second DC/DC converter 322 or the third DC/DC converter 324, respectively. Therefore, the current sensor of this embodiment can sense the current information of the three DC/DC converters in the forward step-down mode, respectively. Since each DC/DC converter is in a working state when its first transistor is conducted, the current information $I_{shunt1}$, $I_{shunt2}$ and $I_{shunt3}$ also produce current signals when the first transistor is in the working state. For example, $I_{shunt1}$ generates a current signal during the time period from t1 to t2 and from t7 to t8 when the first DC/DC converter 320 is in the working state. $I_{shunt2}$ is the current signal which occurs during the time periods from t3 to t4 and from t9 to t10 when the second DC/DC converter 322 is in a working state. $I_{shunt3}$ generates a current signal during the time period from t5 to t6 when the third DC/DC converter 324 is in a working state.

Figure 6:
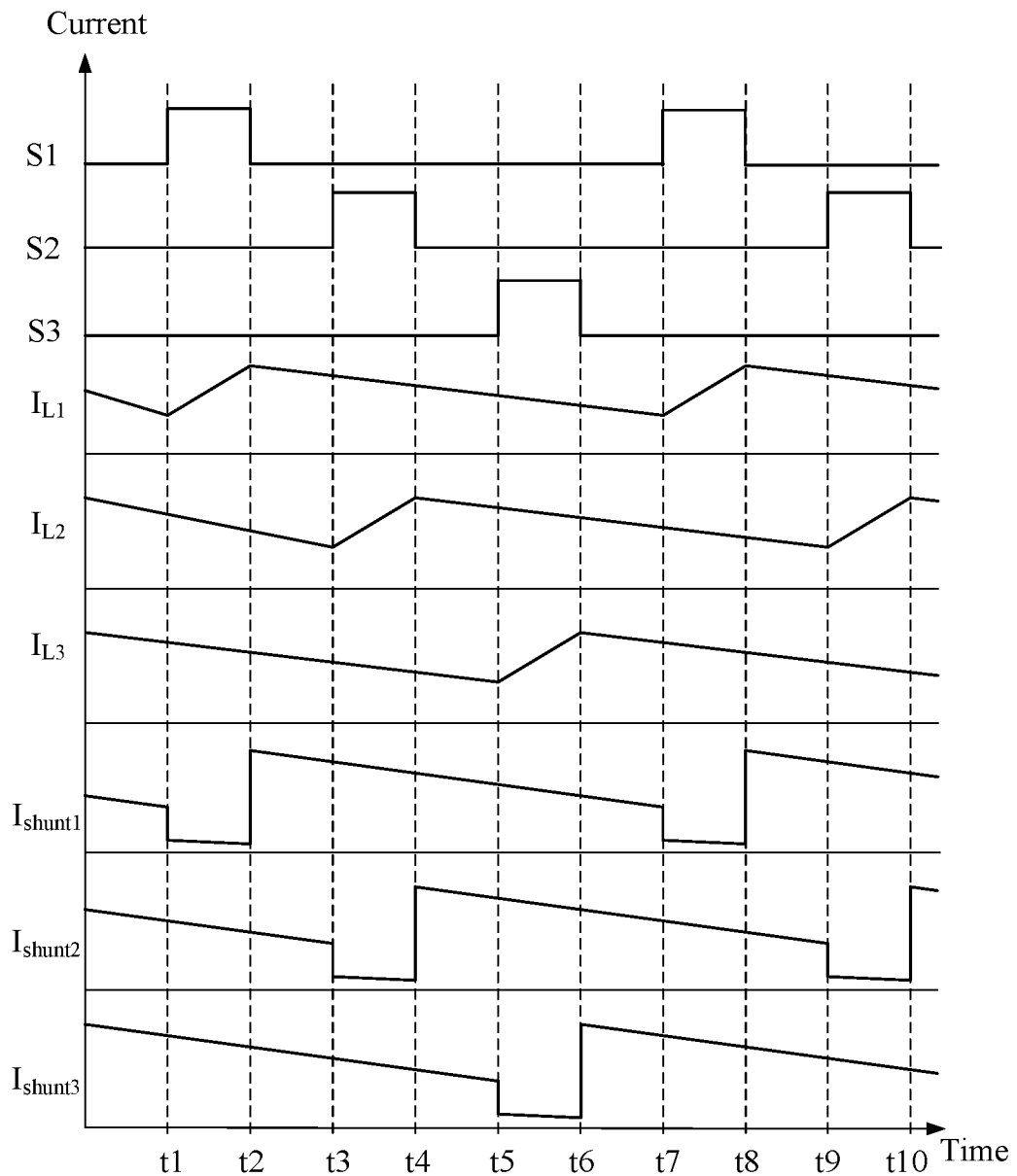
FIG. 6 shows a schematic diagram of current information of a first DC/DC converter, a second DC/DC converter and a third DC/DC converter when the power supply system of FIG. 4 is in a reverse step-up mode.

On the other hand, please refer to FIG. 4 and FIG. 6 together. FIG. 6 shows a schematic diagram of current information of a first DC/DC converter 320, a second DC/DC converter 322 and a third DC/DC converter 324 when the power supply system of FIG. 4 is in a reverse step-up mode. As shown in FIG. 6, the pulse-width modulation controller controls the duty cycles of the first DC/DC converter 320, the second DC/DC converter 322 and the third DC/DC converter 324 approximately the same as in the forward step-down mode. However, the load 2 charges the first power supply 30 and the second power supply 34 during the reverse step-up mode. Therefore, when the first DC/DC converter 320, the second DC/DC converter 322 and the third DC/DC converter 324 are in the working state, the current of the load 2 flows into the high potential output terminals of the first power supply 30 and the second power supply 34, and when each converter is in a non-working state (the second transistor of each converter is conducted), the current sensing resistors 360, 362, and 364 flow through respectively. The sensed $I_{shunt1}$, $I_{shunt2}$, and $I_{shunt3}$ will decrease when the corresponding DC/DC converter is in the working state.

Therefore, the power supply system 3 of FIG. 4 uses the current sensing resistors respectively disposed on the low potential sides of the input terminals of the first, second and third DC/DC converters, and for the duty cycle control of each DC/DC converter, the individual current information of the DC/DC converter can be obtained independently either in the forward step-down mode or the reverse step-up mode. In addition, as shown in FIG. 4, each current sensing resistor can sense the current information of each DC/DC converter without additional differential amplifier circuit or potential conversion circuit.

In summary, the power supply system of the present invention uses a plurality of DC/DC converters connected in parallel between two power supplies and can be applied to the fields of electric locomotives, electric vehicles, and chargers, etc. By arranging a current sensor between the low potential side of the input terminal of the DC/DC converter and the ground terminal of the first power supply, the current information of each DC/DC converter can be sensed individually to monitor each converter. In addition, the current sensor is only a current sensing resistor and has a simple circuit structure, which does not affect the original power supply circuit and can also achieve the effects of improving the sensing accuracy and reducing the manufacturing cost.

With the detailed description of the above embodiments, it is hoped that the features and spirit of the present invention can be more clearly described, and the scope of the present invention is not limited by the embodiments disclosed above. On the contrary, the intention is to cover various changes and equivalent arrangements within the scope of the patents to be applied for in the present invention. Therefore, the scope of the patentable scope for which the present invention is claimed should be construed in the broadest sense in accordance with the above description so as to encompass all possible modifications and equivalent arrangements.

What is claimed is:

1. A power supply system for outputting current to a load, the power supply system comprising:
   a first power supply;
   a plurality of DC/DC converters connected to the first power supply, each of the plurality of DC/DC converters comprising a first transistor connected to a high potential output terminal of the first power supply and a second transistor connected to a ground terminal of the first power supply;
   a second power supply, connected to the plurality of DC/DC converters and configured for connecting to the load, the second power supply being located between the plurality of DC/DC converters and the load, and voltage of the second power supply being different from the voltage of the first power supply, the first power supply, the plurality of DC/DC converters, the second power supply and the load being arranged in parallel;
   a current sensor configured between the first power supply and a low potential side of input terminals of the plurality of DC/DC converters, and the current sensor being configured for sensing a current information of the power supply system; and
   a controller, coupled to the first transistors and the second transistors of the plurality of DC/DC converters and configured to respectively control the conducting states of the first transistors and the second transistors;
   wherein, the power supply system selectively switches to a forward step-down mode according to traveling conditions of the electric vehicle system; when the power supply system is in the forward step-down mode, the controller turns on at least one of the first transistors of the DC/DC converters to connect the first power supply and the second power supply in parallel to enable the first power supply and the second power supply to output power to the load, and the current sensor receives the current flowing from the low potential side of the input terminals of the DC/DC converters to the ground terminal of the first power supply.

2. The power supply system of claim 1, wherein the plurality of DC/DC converters are buck converters, each of the buck converters has a half-bridge structure.

3. The power supply system of claim 1, wherein the controller is a pulse-width modulation controller (PWM controller) and is configured for respectively outputting pulse signals to the first transistors and the second transistors to respectively control the conducting states of the first transistors and the second transistors.

4. The power supply system of claim 1, wherein the number of the DC/DC converters is 2, and the current sensor is a current sensing resistor, the current sensing resistor is disposed between the ground terminal of the first power supply and the low potential side of the input terminals of the DC/DC converters.

5. The power supply system of claim 4, wherein the DC/DC converters are controlled by the controller to be turned on and off respectively, and the current sensor senses the current information of the DC/DC converters respectively.

6. The power supply system of claim 1, wherein the number of the DC/DC converters is 3 or more than 3, and the current sensor further comprises a plurality of current sensing resistors, the number of the current sensing resistors is equal to the number of the DC/DC converters, and the current sensing resistors are respectively connected to the low potential sides of the input terminals of the DC/DC converters to sense the individual current information of the DC/DC converters respectively.

7. The power supply system of claim 1, wherein the load is an electric vehicle system, and the power supply system selectively switches to a reverse step-up mode according to traveling conditions of the electric vehicle system.

8. The power supply system of claim 7, wherein when the power supply system is in the reverse step-up mode, the controller turns on at least one of the first transistors of the DC/DC converters to connect the first power supply and the second power supply in parallel to enable the first power supply and the second power supply to be recharged by a regenerative power of the load, and the current sensor receives the current flowing from the ground terminal of the first power supply to the low potential side of the DC/DC converters.

* * * * *